(12) United States Patent
Persson (10) Patent No.: US 10,514,751 B2
(45) Date of Patent: Dec. 24, 2019

(54) CACHE DORMANT INDICATION (71) Applicant: ARM LIMITED, Cambridge (GB)

(72) Inventor: Håkan Persson, Bjärred, Skåne (SE)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/040,440

(22) Filed: Feb. 10, 2016

(65) Prior Publication Data
US 2016/0259729 A1 Sep. 8, 2016

(30) Foreign Application Priority Data

Mar. 2, 2015 (GB) .................................. 1503507.4

(51) Int. Cl.
G06F 1/3234 (2019.01)
G06F 1/3225 (2019.01)
G06F 12/0831 (2016.01)
G06F 12/0891 (2016.01)
G06F 12/0877 (2016.01)
G06F 12/0808 (2016.01)
G06F 12/0815 (2016.01)

(52) U.S. Cl.
CPC .......... *G06F 1/3275* (2013.01); *G06F 1/3225* (2013.01); *G06F 12/0831* (2013.01); *G06F 2212/1041* (2013.01); *G06F 2212/621* (2013.01); *Y02D 10/13* (2018.01); *Y02D 10/14* (2018.01)

(58) Field of Classification Search
CPC ............. G06F 12/0833; G06F 12/0877; G06F 12/0808; G06F 12/0815; G06F 12/0891; G06F 1/3225; G06F 1/3275; G06F 2212/621; G06F 12/0831; G06F 2212/1041; Y02B 60/1225; Y02D 10/13; Y02D 10/14

USPC ......................................... 711/144, 141, 146
See application file for complete search history.

(56) References Cited

U.S. PATENT DOCUMENTS

| 7,934,054 B1* | 4/2011 | Moll .................... G06F 1/3203 345/541 |
| 2005/0107986 A1* | 5/2005 | Jones .................. G06F 11/3466 702/186 |
| 2011/0153924 A1 | 6/2011 | Vash et al. |
| 2011/0213993 A1* | 9/2011 | Greenhalgh .......... G06F 1/3203 713/320 |
| 2014/0052905 A1* | 2/2014 | Lih ..................... G06F 12/0831 711/105 |
| 2014/0089590 A1* | 3/2014 | Biswas ................. G06F 1/3225 711/128 |

(Continued)

FOREIGN PATENT DOCUMENTS

| EP | 1 607 838 | 12/2005 |
| EP | 2 469 377 | 6/2012 |

OTHER PUBLICATIONS

Search Report for GB 1503507.4, dated Aug. 13, 2015, 3 pages.

*Primary Examiner* — Shane D Woolwine
(74) *Attorney, Agent, or Firm* — Nixon & Vanderhye P.C.

(57) ABSTRACT

A data processing apparatus includes a first agent which generates a cache dormant indication when a cache is in a dormant state, and a second agent which issues cache maintenance requests for data stored in the cache accessed by the first agent. In response to the cache dormant indication generated by the first agent, the second agent may suppress issuing of cache maintenance requests for the cache accessed by the first agent.

16 Claims, 3 Drawing Sheets

(56) References Cited

U.S. PATENT DOCUMENTS

2014/0359330 A1* 12/2014 Gendler ............... G06F 1/3206
713/323

* cited by examiner

CACHE DORMANT INDICATION

BACKGROUND

This application claims priority to GB Patent Application No. 1503507.4 filed 2 Mar. 2015, the entire contents of which is hereby incorporated by reference.

The present technique relates to the field of data processing. More particularly, it relates to the handling of cache maintenance requests for a cache:

A data processing system may have several agents which may share a common address space. One or more caches may be provided which may be accessible to one or more of these agents.

SUMMARY

In at least some examples, the present technique provides a data processing apparatus comprising:

a first agent configured to generate a cache dormant indication when a cache is in a dormant state; and a second agent configured to issue cache maintenance requests for data stored in the cache, wherein in response to the cache dormant indication generated by the first agent, the second agent is configured to supress issuing of at least some cache maintenance requests for the cache.

In another example, the present technique provides a first agent device comprising:

control circuitry configured to determine whether a cache is in a dormant state, and when the cache is in the dormant state, to generate a cache dormant indication accessible to a second agent device, wherein the second agent device is for issuing cache maintenance requests for data stored in the cache.

In another example, the present technique provides a second agent device comprising:

control circuitry configured to issue cache maintenance requests for data stored in a cache;

wherein in response to a cache dormant indication generated by a first agent device indicating that the cache is in a dormant state, the control circuitry is configured to supress issuing of at least some cache maintenance requests for said cache.

In another example, the present technique provides a data processing apparatus comprising:

first agent means for generating a cache dormant indication when a cache is in a dormant state: and second agent means for issuing cache maintenance requests for data stored in the cache, wherein in response to the cache dormant indication generated by the first agent means, the second agent means is configured to supress issuing of at least some cache maintenance requests for the cache.

In another example, the present technique provides a first agent device comprising:

control means for determining whether a cache is in a dormant state, and when the cache is in the dormant state, generating a cache dormant indication accessible to a second agent device, wherein the second agent device is for issuing cache maintenance requests for data stored in the cache.

In another example, the present technique provides a second agent device comprising:

control means for issuing cache maintenance requests for data stored in a cache;

wherein in response to a cache dormant indication generated by a first agent device indicating that the cache is in a dormant state, the control means is configured to supress issuing of at least some cache maintenance requests for said cache.

In another example, the present technique provides a data processing method comprising:

a first agent generating a cache dormant indication when a cache is in a dormant state; and in response to the cache dormant indication generated by the first agent, a second agent suppressing issuing of at least some cache maintenance requests for maintaining coherency of data stored in the cache.

In another example, the present technique provides a data processing method comprising:

a first agent determining whether a cache is in a dormant state: and when the cache is in the dormant state, generating a cache dormant indication which is accessible to a second agent, wherein the second agent device is for issuing cache maintenance requests for data stored in the cache.

In another example, the present technique provides a data processing method comprising:

determining whether a first agent has generated a cache dormant indication indicating whether a cache is in a dormant state; and when the first agent has generated the cache dormant indication, suppressing issuing of at least some cache maintenance requests for data stored in the cache.

In another example, the present technique provides a storage medium storing a computer program which, when executed by a processing unit, controls the processing unit to perform any of the methods above. The storage medium may be a non-transitory storage medium.

The above, and other objects, features and advantages will be apparent from the following detailed description of illustrative embodiments which is to be read in connection with the accompanying drawings.

BRIEF DESCRIPTION OF THE DRAWINGS

Further aspects, features and advantages of the present technique will be apparent from the following description of examples, which is to be read in conjunction with the accompanying drawings, in which.

DESCRIPTION OF EXAMPLE EMBODIMENTS

A data processing system may have several agents which may share a common address space. One or more caches may be provided which may be accessible to one or more of these agents. To maintain coherency one of the agents may be responsible for issuing maintenance requests for data stored in the cache. The cache maintenance requests may for example include requests to invalidate data in the cache, or requests to write back dirty values to memory so that they become accessible to other agents. However, there is an overhead associated with such cache maintenance requests, both in tracking the progress of such requests at the second agent and in servicing the requests at the cache itself. In some cases, the agent that is responsible for issuing cache maintenance requests may not be aware of the state of the cache.

A first agent may generate a cache dormant indication when a cache is in a dormant state. In response to the cache dormant indication generated by the first agent, the second agent may suppress issuing of at least some cache maintenance requests for the cache. By providing a hint to the second agent that the cache is dormant then the second agent does not need to issue cache maintenance operations and track the progress of such operations, and the cache does not need to service the cache maintenance operations, which may save processing resource at both the cache and the second agent, increase performance and save energy.

There may be a number of ways in which it can be determined if the cache is in the dormant state. In one example the cache may be considered dormant when it stores no valid data, In other examples the cache may be considered dormant when there is no valid data and there are also no outstanding transactions for updating the cache still to be processed. When the cache does not contain any valid data, there cannot be any incoherency between the cache and other devices, and so cache maintenance requests are unnecessary at this time.

In another example the cache may be considered to be in the dormant state when it stores no dirty data. Hence, even if there is some clean data in the cache, the cache may still be considered dormant provided there is no dirty data. Dirty data is data which has been modified in comparison to the corresponding data in memory. For example, if the cache only contains clean data, then the first agent may suppress issuing of clean commands to trigger the cache to write back dirty data to the memory.

Some examples may generate the cache dormant indication based on whether the cache includes any valid data or any dirty data, regardless of the type of data.

In other examples the cache dormant indication may be based on a more specific partitioning of the types of the data stored in the cache. For example in some cases only some of the data in the cache may be relevant to the second agent and so it is unlikely that the second agent will issue cache maintenance requests for other types of data. In this case, the cache could be considered to be in the dormant state when the cache stores no valid data that is relevant to the second agent. For example the data in the cache may be divided into different categories, and the cache dormant indication may be generated if the cache has no data of one or more predetermined categories which are deemed to be of relevance to the second agent, even if there is valid data from another category. For example if the cache is a translation lookaside buffer (TLB) for caching address translation data. TLB entries for different address spaces could be tracked and the cache dormant indication may depend on whether there are any valid entries for a particular address space which is of interest to the second agent, even if there are valid entries for other address spaces.

In another example the cache may be considered to be in a dormant state when the cache itself, or a part of the apparatus including the cache, is in a power saving state. When in the power saving state, the cache may not store any valid data, and there would be no need to service cache maintenance requests. Suppressing the issuing of cache maintenance requests while the cache is in the power saving state can avoid the need to power up the cache or a larger part of the apparatus in order to service the cache maintenance requests, saving energy, There are some devices such as a graphics processing unit which may spend a significant amount of time in a power saving state and so there is often scope for reducing the cache maintenance overhead using the cache dormant indication.

The cache dormant indication may in some cases merely be a hint that the cache maintenance requests are not required. On some occasions the second agent may still choose to override this and continue to issue a cache maintenance request despite the cache dormant indication being generated. For example the second agent may have different modes and may in one mode consider the cache dormant indication and in another mode ignore it.

The cache dormant indication could be generated in different ways. In one example the first agent could generate the cache dormant indication by setting a cache dormant flag in a storage location which is accessible to the second agent. For example a register may include the cache dormant flag and the second agent could read the register to determine whether the cache is in the dormant state.

In another example the first agent may transmit a hardware signal to the second agent to indicate whether the cache is in the dormant state. For example the first agent could assert a signal which is transmitted over an interconnect or bus interface to the second agent, and deassert the signal when the cache is no longer dormant. Similarly, the first agent could transmit at least one message to the second agent to indicate whether the cache is in the dormant state. For example when the cache becomes dormant the first agent could transmit a dormant start message and then when the cache is no longer dormant then the first agent could transmit a dormant stop message. Alternatively the first agent could transmit periodic messages indicating whether the cache is currently dormant.

The cache maintenance requests may take various forms. In general they may comprise any requests for ensuring consistency or coherency of data within the data processing system. For example the maintenance requests may include snoop requests for querying whether data from a particular address is stored in the cache or querying a coherency status of data stored in the cache (for example the coherency status may indicate whether the data is shared or exclusive to the first agent or may indicate whether the data is dirty or clean). Also the cache maintenance request may include clean requests which request that dirty data from one or more specified addresses is written back to memory. Also the maintenance request could include invalidate requests to invalidate data stored in the cache, so that any dirty values from the specified addresses are discarded and the cache made consistent with any clean values provided elsewhere within the memory system as a whole. Some cache maintenance requests could combine several of these types of requests, e.g. a clean and invalidate request which first cleans the data and then invalidates it from the cache.

In some cases, the cache dormant indication may be used to suppress only some types of cache maintenance request, while other types may still be issued even when the cache dormant indication is generated. For example, if the cache dormant state is considered to be a state when the cache does not contain any dirty data but may still contain clean data, then clean requests could be suppressed as these would not have any effect on the clean data in the cache, but invalidate requests could still be issued as these may still affect the clean data in the cache.

In some cases the first agent and the second agent may comprise separate processing devices. For example the first agent could be a graphics processing unit (GPU) and the second agent could be a central processing unit (CPU) within a data processing system. The present technique can be particularly useful where the first agent comprises a GPU, as often a GPU may be inactive or in a power down state for a significant period of time. For example, when a data processing device is used for internet browsing, a GPU may only be active for short periods while rendering frames, and inactive for longer periods between successive rendering tasks. During the periods of inactivity, the GPU's caches may be dormant, and so providing a hint to this effect to the CPU or other second agent can reduce the number of cache maintenance operations that need to be issued.

In some cases, the first agent may be the device which comprises the cache, which can provide hints to the second agent about whether its own cache is in the dormant state.

In other cases, the second agent may comprise the cache, or the cache could be part of a third agent separate from both the first and second agents. In this case, the first agent may not include the cache itself, but may have knowledge about the state of the cache, For example, the first agent may be a power controller which controls whether the cache is in a power saving state, and when the cache is in the power saving state, the power controller may send the cache dormant indication to the second agent so that the second agent can suppress the cache maintenance operations.

In other examples, the first agent and the second agent may comprise the same processing device. For example the first agent and the second agent could be different parts of the same device or could correspond to different software executing on the same device. For example a device may have two separate software drivers which control different aspects of a device. For example, in a GPU typically the commands from a GPU driver determine the power state of the GPU either directly or indirectly (the GPU driver may issue commands to explicitly power up or down the GPU processing logic, or the GPU may independently decide to power down/up depending on whether there is a task to process). Typically (but not necessarily) the GPU power state also affects the GPU MMU caches, such as a translation lookaside buffer (TLB). The MMU driver for the GPU does not necessarily have information about the current state of the GPU, so there is benefit in providing a dormant hint from the GPU driver (first agent) to the MMU driver (second agent) so the MMU driver can suppress TLB invalidations for the GPU TLB. The interface logic for the GPU towards both the GPU driver and the MMU driver may be powered down separately from the main GPU processing logic.

In another example a relatively complex semi-autonomous device may be managed by a single agent that does not have visibility of the detailed state of the device and so the first and second agents may correspond to different parts of the device which may provide a hint to one another that cache maintenance requests are not currently required.

The cache may be any cache within a data processing device. In some cases the cache may be a data cache which stores data to be processed by the first agent, the second agent or a third agent. In other examples a cache may be an address translation cache (such as a translation lookaside buffer (TLB) or micro TLB). The address translation cache may store address translation data, such as page table entries or other control structures, for controlling translation of virtual addresses into physical addresses or other kinds of addresses.

Figure 1:
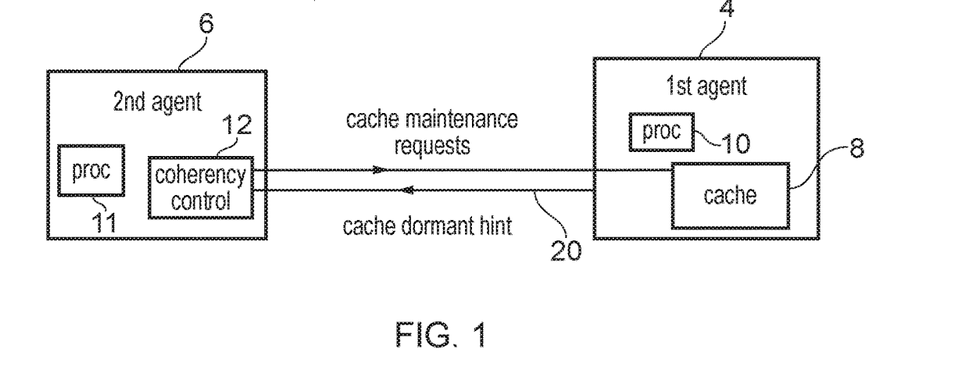
FIG. 1 schematically illustrates an example of data processing system having a first agent and a second agent in which the second agent can provide a cache dormant hint to the first agent.

A first agent device may include control circuitry for generating the cache dormant indication when the cache is determined to be in a dormant state. The control circuitry could be part of processing circuitry within the agent device, part of the cache or a cache controller, or a separate circuit altogether, FIG. 1 shows an example of a data processing system 2 comprising a first agent 4 and a second agent 6, In this example the first and second agents 4, 6 are separate processing devices. For example the first agent 4 could be a processor. GPU or co-processor, or any other device having a cache. The second agent 6 may be a processor. CPU, cache controller or interconnect, or any other device with at least some responsibility for ensuring cache coherency in the data processing system 2. The first agent 4 has an associated cache 8 for caching data local to the first agent 4. The first agent 4 also has processing circuitry 10 which may control the operations of the first agent 4. The second agent 6 has processing circuitry 11 and coherency control circuitry 12 for managing coherency of data within the processing system 2. In some cases the coherency control circuitry 12 may be part of the processing circuitry 11 of the second agent 6.

The processing circuitry 10 of the first agent 4 may detect whether its cache 8 is in a dormant state or not. Various conditions may be used to determine whether the cache 8 is dormant, including any of the following:

when the cache stores no valid data (the locations in the cache are all marked as invalid);

when the cache stores no valid data and there are no outstanding transactions for updating the cache still to be processed;

when the cache stores no valid data that is relevant to the second agent (the locations in the cache either contain invalid data or data which is not relevant to the second agent);

when the cache stores no valid data from one or more selected categories of data (the locations in the cache either contain invalid data or data from a category that is not relevant to the second agent 6);

when the cache 8 and/or the first agent 4 is in a power saving state;

when the cache contains no dirty data (all valid data in the cache is marked as clean).

It will be appreciated that there are many other situations in which the cache could be considered dormant, When the cache is in the dormant state, then the Out agent generates a cache dormant hint 20 which is made accessible to the second agent 6. This could be done in various ways, e.g. by setting a flag in a control register which is accessible to the second agent 6, or by sending a hardware signal or a message to the second agent 6, When the cache dormant hint is generated by the first agent 4 then the second agent 6 may suppress issuing of at least some cache maintenance requests to the cache 8 of the first agent 4. This avoids the overhead of tracking the progress and completion of the cache maintenance request at the side of the second agent 6, and also avoids the overhead of processing the cache maintenance requests at the cache 8 of the first agent 4, saving processing resource at both sides.

In some cases the first agent 4 may include more than one cache. It is possible for the first agent 4 to generate multiple cache dormant indications each corresponding to a different cache, with the second agent 6 distinguishing whether to issue cache maintenance requests for data in each type of cache based on the corresponding cache dormant indication.

However, in some systems it may be rare that only some of the caches will be dormant (often the caches will all be dormant when the first agent 4 as a whole is inactive), and so in such systems the additional overhead of generating and responding to multiple cache dormant indications may not always be justified.

Figure 2:
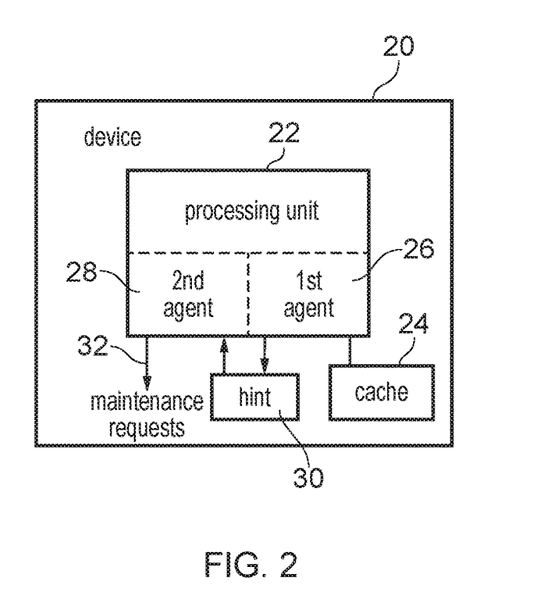
FIG. 2 shows an example where the first agent and the second agent may be the same device.

FIG. 2 shows another example of a data processing device 20 which comprises a processing unit 22 for performing data processing operations and a cache 24 for caching data local to the device 20. The processing unit 22 executes various software processes including a first agent software program 26 and a second agent software program 28. For example the first and second agents may correspond to different drivers executed by the processing unit 22 to control different aspects of the control device 20. For example. if the device comprises a memory management unit (MMU), the first agent software 26 may be a MMU driver for controlling address translation in the MMU, which has responsibility for internal caches 24 of the MMU, while the second agent software 28 may be another driver for controlling data processing activity of the processing unit 22. Without the cache dormant hint provided by the first agent software 26, the second agent software 28 may not typically be aware of whether the cache 24 managed by the first agent software 26 is active or not, since the drivers may be written independently of one another. However, if the first agent software 26 generates a cache dormant hint 30 and makes this available to the second agent software 28, the second agent software 28 can suppress issuing of cache maintenance requests for data in the cache 24, to reduce processing overhead when there is no relevant data that would be affected by such cache maintenance requests. The cache dormant hint 30 may be generated using any of the techniques described above, For example the hint 30 may be a control flag within a control register which is accessible to the second agent 28, Alternatively, in some systems an MMU driver may be regarded as the second agent which is responsible for cache invalidations within the MMU, and a GPU driver may be regarded as the first agent which controls the power state of the GPU including its MMU's caches, and issues a hint to the MMU driver when the cache is powered down no that the MMU driver can suppress cache invalidations.

Figure 3:
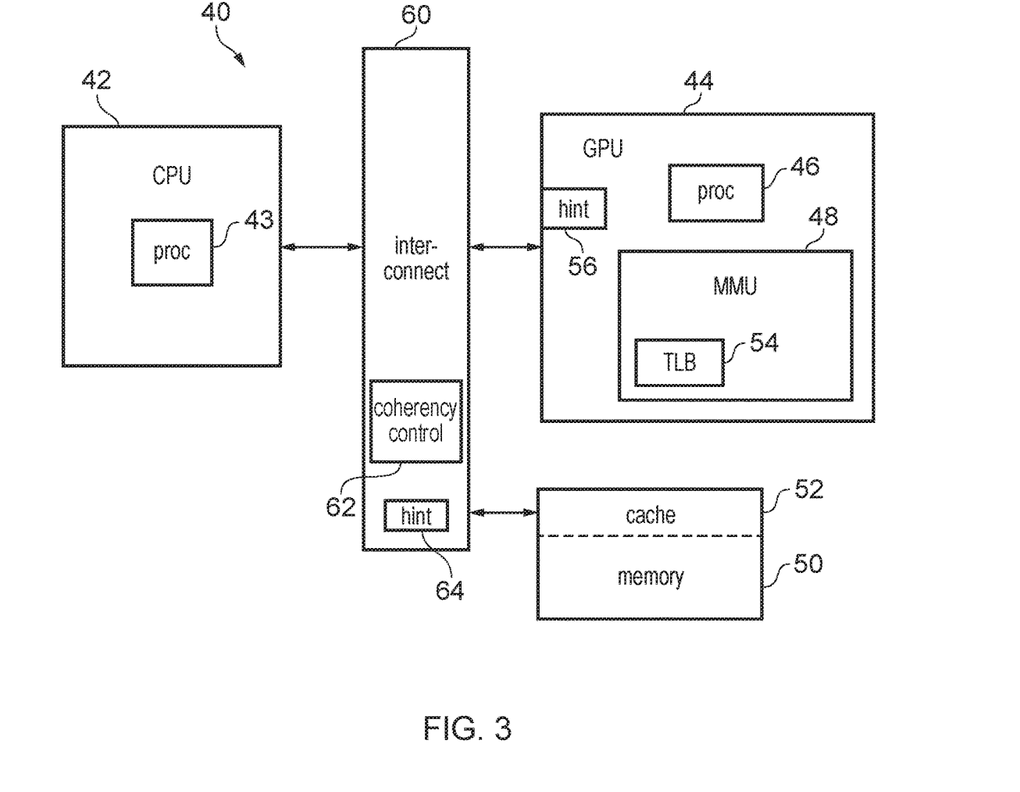
FIG. 3 shows an example of a data processing system comprising a graphics processing unit which may provide a hint to a host processor indicating whether its cache is dormant.

FIG. 3 shows another example of a data processing system 40 which comprises a central processing unit (CPU) 42 having a processing pipeline 43 for performing general purpose data processing operations, and a graphics processing unit (GPU) 44 having a graphics processing pipeline 46 for performing graphics processing operations on behalf of the CPU 42. The graphics processing pipeline 46 may be designed more specifically for graphics processing operations than the general purpose pipeline 43, e.g. the GPU 44 may be more efficient at handling a large number of threads for rendering different areas of a graphics image than the CPU 42. It will be appreciated that the FIG. 3 example is simplified and there may be many other components included in the system 40 which were not shown in FIG. 3.

The GPU 44 may have an integrated memory management unit (MMU) 48 for controlling address translation of virtual addresses specified by the GPU 44 into physical addresses used to access data in memory 50. The memory 50 may include one or more caches 52. The MMU 48 has one or more internal caches for caching data for use in address translation, For example, one such cache is a translation lookaside buffer (TLB) 54 for caching page table entries which define how to map a virtual address to a physical address, and which may also define access permissions controlling whether accesses to particular addresses are allowed. The TLB 54 is effectively a cache of some of the entries of a larger page table stored in memory 50, 52.

In such a system, often there may be no graphics processing task at hand for the GPU 44 to process. For example a frame to be rendered may have already been completed and the GPU may be waiting for another frame to render. At this time the GPU as whole 44, or parts of it such as the MMU 48, may be powered down and placed in a power saving mode to save energy. When the MMU 48 is powered down the caches for the MMU 48 such as the TLB 54 may be invalidated so that they do not contain any valid data.

The page tables in memory 50 may be controlled by the CPU 42, which may sometimes update the page tables under control of an operating system or hypervisor or other control program. As the TLB 54 may contain some of the entries to be updated, the CPU 42 may send cache invalidation operations to the MMU 48 of the GPU 44 to ensure that any old data is cleared from the TLB 54. However, if the MMU 48 has already been powered down and contains no valid data, none of these cache invalidation operations would have any effect on the MMU 48. To avoid the CPU 42 needing to generate the commands and track whether they have been completed, and to avoid bringing the MMU 48 out of the power saving state to service the commands, when placing the MMU in the power saving state or invalidating all the data in the MMU's TLB 54, the GPU 44 can generate the cache dormant hint 56 and make this available to the CPU 42. The CPU 42 then does not need to issue any cache maintenance operations such as the invalidate commands for the TLB 54. This saves energy and also allows other operations to proceed more quickly at the CPU 42 since they do not need to wait for completion of the cache maintenance commands. improving performance.

In the example discussed above, the CPU 42 is responsible for issuing cache maintenance operations. In other examples an interconnect 60 which manages communication between the CPU 42 and the GPU 44 may have coherency control circuitry 62 which monitors traffic over the interconnect and generates cache maintenance commands if one device attempts to update or access data which is also cached in another device. In this case the coherency control circuitry 62 within the interconnect may also respond to the cache dormant hint 56 provided by the GPU 44 to suppress issuing of cache maintenance operations if the cache is dormant. Hence the interconnect 60 may in some cases be regarded as the second agent.

Similarly, in some cases the interconnect 60, rather than the GPU 44 itself, may detect whether the cache is dormant, and generate a cache dormant hint which is made accessible to the CPU 42 to stop the CPU generating cache maintenance commands. For example, the interconnect 60 may have a snoop filter which tracks which data is cached in various caches within the system 40. In some systems the snoop filter may be an inclusive snoop filter which is updated each time data is stored or invalidated in the cache 54. In this case, provided that the GPU 44 informs the interconnect 60 when data is invalidated from its cache 54, it is possible for the snoop filter to detect that the cache 54 is in a dormant state where it contains no valid data, for example, and to set a cache dormant hint 64 to inform the CPU 42 that it should stop sending cache maintenance commands. In this case, the interconnect 60, or the interconnect 60 and GPU 44 in combination, may be regarded as the first agent.

Figure 4:
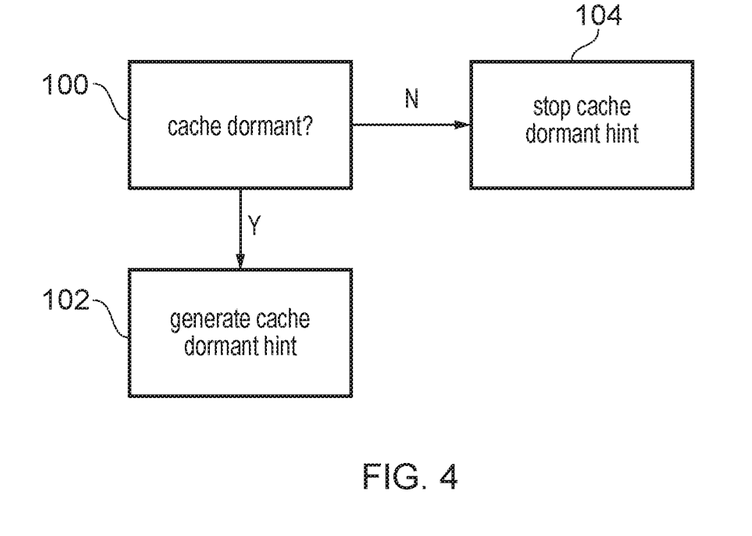
FIG. 4 illustrates a method of generating a cache dormant hint.

FIG. 4 shows a method of generating a cache dormant indication. At step 100 the first agent determines whether the cache is currently in the dormant state. For example this may depend on whether the cache includes any valid data, whether the cache includes any dirty data, whether the cache includes data from one or more particular categories (e.g. TLB data from a particular context or address spaces), or whether the cache is currently powered down. If the cache is currently dormant then at step 102 the first agent generates the cache dormant hint according to any of the techniques discussed above, such as by setting a flag in a register, asserting a hardware signal or generating a message which is transmitted to the second agent. If the cache is not dormant then at step 104 the cache dormant hint is not generated, or any previously generated cache dormant hint is stopped (e.g. the hardware signal is deasserted or a dormant stop message is generated).

Figure 5:
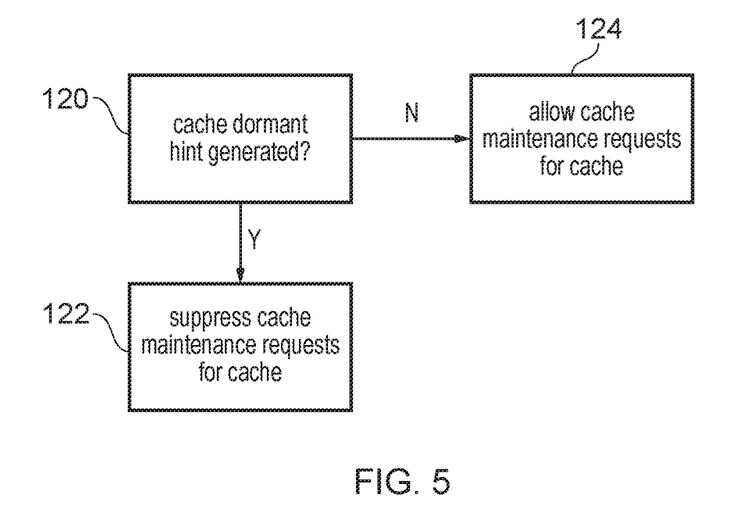
FIG. 5 illustrates a method of controlling generation of cache maintenance requests based on the cache dormant hint.

FIG. 5 schematically illustrates a method of controlling issuing of cache maintenance requests. At step 120 the second agent determines whether the cache dormant hint has been generated by the first agent. If so then at step 122 at least some types of cache maintenance requests for that cache are suppressed (the types to be suppressed may depend on the nature of the cache dormant state indicated by the cache dormant hint). If the cache dormant hint is not generated then at step 124 the second agent allows cache maintenance requests to be issued for the cache of the first agent, In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

I claim:

1. A data processing apparatus comprising:
   first agent circuitry configured to set, on transition of an entire cache memory module into a dormant state, a cache dormant flag in a register accessible to a software driver executed by second agent circuitry, the cache dormant flag providing a hint to the software driver executed by the second agent circuitry that the entire cache memory module is dormant and so it is unnecessary for the second agent circuitry to issue cache maintenance requests; and
   said second agent circuitry configured to execute said software driver to issue cache maintenance requests for data stored in the cache memory module, and to suppress generation of at least some cache maintenance requests for the cache memory module in response to the cache dormant flag set in the register by the first agent circuitry,
   wherein the first agent circuitry and the second agent circuitry comprise separate physical devices.

2. The apparatus according to claim 1, wherein the entire cache memory module is in the dormant state when the cache memory module stores no valid data.

3. The apparatus according to claim 1, wherein the entire cache memory module is in the dormant state when the cache stores no valid data and there are no outstanding transactions for updating the cache memory module.

4. The apparatus according to claim 1, wherein the entire cache memory module is in the dormant state when the cache memory module stores no dirty data.

5. The apparatus according to claim 1, wherein the entire cache memory module is in the dormant state when the cache memory module stores no valid data relevant to the second agent circuitry.

6. The apparatus according to claim 1, wherein the entire cache memory module is in the dormant state when the cache memory module stores no valid data of at least one predetermined category.

7. The apparatus according to claim 1, wherein the entire cache memory module is in the dormant state when the cache memory module is in a power saving state.

8. The apparatus according to claim 1, wherein the cache maintenance requests comprise one or more of:
   snoop requests to query whether data is stored in the cache memory module or to query a coherency status of data stored in the cache memory module;
   clean requests to trigger write back of dirty data from the cache memory module to memory; and
   invalidate requests to invalidate data stored in the cache memory module.

9. The apparatus according to claim 1, wherein in response to the cache dormant indication, the first agent circuitry is configured to suppress issuing of at least one predetermined type of cache maintenance request.

10. The apparatus according to claim 1, wherein the first agent circuitry comprises a graphics processing unit.

11. The apparatus according to claim 1, wherein the cache memory module comprises a data cache configured to store data to be processed.

12. The apparatus according to claim 1, wherein the cache memory module comprises an address translation cache configured to store address translation data for translating addresses.

13. A first agent device comprising:
    control circuitry configured to:
        determine whether an entire cache memory module is in a dormant state, and
        on transition of the entire cache memory module into the dormant state, to set a cache dormant flag in a register accessible to a software driver executed by a second agent device for issuing cache maintenance requests for data stored in the cache memory module,
    the cache dormant flag providing a hint to the software driver executed by the second agent circuitry that the entire cache memory module is dormant and so it is unnecessary for the second agent circuitry to issue cache maintenance requests,
    wherein the first agent device and the second agent device comprise separate physical devices.

14. A data processing method comprising:
    a first agent setting, on transition of an entire cache memory module into a dormant state, a cache dormant flag in a register accessible to a software driver executed by a second agent, the cache dormant flag providing a hint to the software driver executed by the second agent that the entire cache memory module is dormant and so it is unnecessary for the second agent to issue cache maintenance requests; and
    in response to the cache dormant flag generated by the first agent, the second agent executing the software driver suppressing generation of at least some cache maintenance requests for maintaining coherency of data stored in the cache memory module, wherein the first agent and the second agent comprise separate physical devices.

15. A data processing method comprising:

a first agent determining whether a cache is in a dormant state; and on transition of the cache to the dormant state, setting a cache dormant flag in a register which is accessible to a software driver executed by a second agent for issuing cache maintenance requests for data stored in the cache, the cache dormant flag providing a hint to the software driver executed by the second agent that the cache is dormant and so it is unnecessary for the second agent to issue cache maintenance requests, wherein the first agent and the second agent comprise separate physical devices.

16. A non-transitory storage medium storing a computer program which when executed by a processing unit controls the processing unit to perform the method of claim 15.

* * * * *